US010372497B1

(12) United States Patent
Zelenov et al.

(10) Patent No.: US 10,372,497 B1
(45) Date of Patent: Aug. 6, 2019

(54) OFFLOADING GPU COMPUTATIONS FOR COMPUTERS AND VIRTUAL MACHINES

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Costa Del Sol (SG); Alexey Koryakin, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 141 days.

(21) Appl. No.: 15/695,141

(22) Filed: Sep. 5, 2017

(51) Int. Cl.
*G06F 9/455* (2018.01)
*G06F 9/50* (2006.01)
*G06F 9/54* (2006.01)

(52) U.S. Cl.
CPC ........ *G06F 9/5011* (2013.01); *G06F 9/45558* (2013.01); *G06F 9/54* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 7,725,305 B2 * | 5/2010 | Taillefer | ............... | G06F 9/45537 703/23 |
| 8,104,083 B1 * | 1/2012 | Sobel | .................. | G06F 9/45558 726/17 |
| 8,938,723 B1 * | 1/2015 | Tormasov | ................. | G06F 8/52 717/136 |
| 9,069,591 B1 * | 6/2015 | Beloussov | .......... | G06F 9/45558 |
| 9,158,569 B2 * | 10/2015 | Mitra | .................. | G06F 9/45558 |
| 9,342,347 B1 * | 5/2016 | Beloussov | .......... | G06F 9/45558 |
| 9,424,430 B2 * | 8/2016 | Rosenan | ............... | G06F 21/575 |
| 10,109,099 B2 * | 10/2018 | Johnson | ............. | G06F 9/45558 |

OTHER PUBLICATIONS

Vasilas et al. "VGVM: Efficient GPU Capabilities in Virtual Machines", 2016 IEEE, pp. 637-644.*
Shi et al. "vCUDA: GPU-Accelerated High-Performance Computing in Virtual Machines", 2012 IEEE, pp. 804-816.*
Fremal et al. "Optimizing Performance of Batch of Applications on Cloud Servers Exploiting Multiple GPUs", 2012 IEEE, 6 pages.*
Shi et al. "vCUDA: GPU-Accelerated High-Performance Computing in Virtual Machines", 2009 IEEE, pp. 1-11.*
Duato et al. "Enabling CUDA Acceleration within Virtual Machines using rCUDA", 2011 IEEE, 10 pages.*

* cited by examiner

*Primary Examiner* — Van H Nguyen
(74) *Attorney, Agent, or Firm* — Arent Fox LLP; Michael Fainberg (57) ABSTRACT

A system and method is provided for performing computations on a virtual machine without a special hardware computation unit, such as a discrete graphics processing unit (GPU). The described method uses a computation module to intercept requests from a user application executing in a virtual machine on a first physical computer. The intercepted requests may include requests to configure GPU computation grids, start and finish accelerated code execution, and transfer data to and from the special computation unit. The computation module offloads accelerated code to a second physical computer having a physical special hardware unit (e.g., discrete GPU).

18 Claims, 7 Drawing Sheets

OFFLOADING GPU COMPUTATIONS FOR COMPUTERS AND VIRTUAL MACHINES

TECHNICAL FIELD

The present disclosure relates generally to managing virtualized computing system resources, and, more particularly, to a system and method for offloading graphics processing unit computations for computers and virtual machines.

BACKGROUND

With virtual machine technology, a user can create and run multiple operating environments on a server at the same time. Each operating environment, or virtual machine, requires its own "guest" operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup.

Virtual machine technology requires employing hardware of a real physical machine or a processor for support of a VM. A hardware element that is increasingly used for acceleration of physical machines is a Graphics Processing Unit (GPU). General-purpose computing on graphics processing units (GPGPU, also referred to as GPGP) is a technique of employing the GPU, which typically handles only computations related to rendering computer graphics for output to a display device, for performing computations for other applications traditionally handled by the CPU.

However, there are an increasing number of lightweight computers in use which do not have a discrete GPU or graphics card. For example, netbooks, thin client laptops (e.g., Chromebooks™ made available by Google®), and other subnotebook computers (e.g., MacBook Air® made available by Apple®) may lack a discrete GPU due to the GPU's high power consumption and thermal properties. In other examples, some desktop computers and servers may lack a discrete GPU or graphics card because of the increased cost to equip such hardware. As such, a user cannot use this type of hardware to run a virtual machine with user software that has an intensive GPU usage, or run host software with intensive GPU usage.

Therefore, it is desirable to support general-purpose computing on graphics processing units (GPGPU) for virtual machines running on a physical machine without a discrete GPU. Accordingly, there is a need in the art for a system and method that addresses the need for supporting GPGPU for VMs executing in lightweight computers without discrete GPUs.

SUMMARY

Thus, a system and method is disclosed herein for managing computing resources in a virtualized environment, and, more particularly, for offloading graphics processing unit computations for computers and virtual machines.

According to one exemplary aspect, a method is provided for performing computations on a virtual machine without a special hardware computation unit. The method includes intercepting, from a user application executing in the virtual machine, a request to load accelerated code prepared for the special hardware computation unit in the virtual machine. The virtual machine may be executing in a first physical computer. The method further includes transmitting the accelerated code comprised of special hardware computation unit instructions to a remote node executing on a second physical computer having a physical special hardware computation unit, and responsive to intercepting from the user application a request to start execution of the accelerated code by the special hardware computation unit of the virtual machine, transmitting to the second physical computer a request to execute the accelerated code using the physical special hardware computation unit of the second physical computer. The method includes, responsive to intercepting from the user application a request to transfer results of the accelerated code execution, retrieving, by the virtual machine, results from the physical special hardware computation unit of the second physical computer, and loading the retrieved results into a memory of the virtual machine.

In another aspect, the special hardware computation unit is a discrete graphics processing unit (GPU), and the accelerated code is a non-display GPU computation.

In another exemplary aspect, the method further includes, responsive to intercepting from the user application a request to allocate special hardware computation unit resources of the virtual machines, configuring resources of the physical special hardware computation unit of the second physical computer.

In another exemplary aspect, the method further includes, transferring an input data set for the accelerated code to a memory of the physical special hardware computation unit of the second physical computer.

In another exemplary aspect, the accelerated code includes executable code in a GPU-executable format and are for performing non-display-related computations.

In another exemplary aspect, the first physical computer lacks a discrete physical GPU.

In another exemplary aspect, the method further includes providing to the user application a parallel computing application programming interface (API) configured to off-load the accelerated code to the second physical computer.

According to another exemplary aspect, a system is provided for performing computations on a virtual machine without a special hardware computation unit. The system includes a first physical computer having a CPU and a memory coupled to the CPU, at least one virtual machine executing on the first physical computer, a user application and a computation module executing in the virtual machine, and a second physical computer having a physical special hardware computation unit and a remote node. The computation module is configured to intercept, from the user application executing in the virtual machine, a request to load a accelerated code in the virtual machine, and transmit the accelerated code comprised of special computation unit instructions to the remote node executing on the second physical computer. The computation module is further configured to, responsive to intercepting from the user application a request to start execution of the accelerated code by the special hardware computation unit of the virtual machine, transmit to the second physical computer a request to execute the accelerated code using the physical special hardware computation unit of the second physical computer, and responsive to intercepting from the user application a request to transfer results of the accelerated code execution, retrieve, by the virtual machine, results from the physical special hardware computation unit of the second physical computer, and load the retrieved results into a memory of the virtual machine.

According to another exemplary aspect, a computer-readable medium is provided comprising instructions that comprises computer executable instructions for performing any of the methods disclosed herein.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 1:
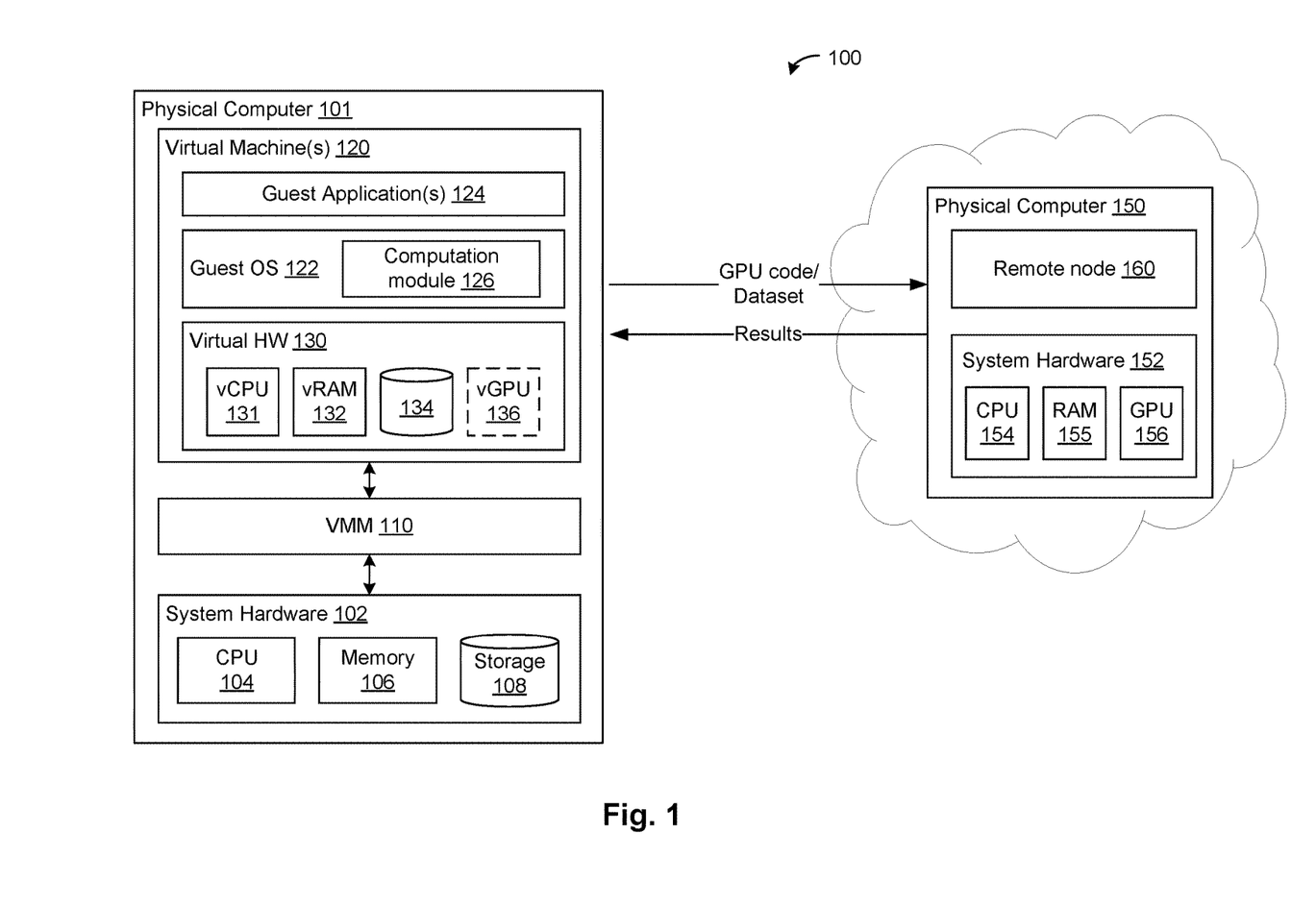
FIG. 1 illustrates a block diagram of a system for offloading GPU computations for computers and virtual machines according to an exemplary aspect.

FIG. 1 illustrates a block diagram of a system 100 for offloading GPU computations for computers and virtual machines according to an exemplary aspect. As shown, the system 100 generally includes one or more physical computers 101. Virtual machines 120 can be created on a host platform of the physical computers that includes system hardware 102 and a virtual machine monitor 110 (also known as a hypervisor or a virtualizer). The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system (not shown) installed on the system hardware 102.

The physical computers 101 may be a physical server, host, computer server, desktop, laptop, handheld device, or any other electronic device sufficient for implementing virtualization as described herein. As shown, the system hardware 102 of a physical computer 101 can include a computer processing unit (CPU) 104, memory 106 (e.g., random access memory), and storage devices 108 (e.g., hard disk drives). The system 100 may include additional devices, software modules, and the like, as would be appreciated to one skilled in the art, but are not shown herein so as to not unnecessarily obscure the aspects of the disclosure.

In the exemplary aspect, the virtual machine 120 includes virtual system hardware 130 and guest system software, including the guest OS 122. The VMM 110 acts as the interface between guest software executing within the VM 120, including one or more guest applications 124 and guest OS 122, and the hardware components and devices in the underlying system hardware platform 102 of the host machine. The virtual system hardware 130 includes a virtual CPU 131, virtual memory 132, a virtual disk 134, as well as other virtual hardware components, such as a virtual network interface (not shown), and the like. It is noted that all of the virtual hardware components of the virtual machine 120 can be implemented in software to emulate corresponding physical components, as would be appreciated to on skilled in the art.

As shown in FIG. 1, the system hardware 102 may lack a discrete or dedicated GPU, also referred to as a graphics card, video card, graphics adapter, accelerator, and so forth. It is understood that the system hardware 102 may optionally have some form of integrated GPU (also referred to as an integrated graphics processor or unified memory architecture) which may be integrated on a motherboard as part of a chipset or even on the same die as the CPU 104. It is noted that an integrated GPU may have a number of limitations, for example, an integrated GPU utilizes a portion of the system's RAM 106, thereby sharing RAM with the CPU 104 rather than have its own dedicated RAM. Such limitations can render a system with an integrated GPU unsuitable for executing software with intensive GPU usage, including parallel computations that are characteristic of GPGPU.

In one exemplary aspect, the virtual machine 120 includes a computation module 126 configured to handle computation requests from a guest application 124 executing in the VM 120. The computation module 126 may be a GPU-related computation library configured to off-load GPU computations to a remote node 160, as the system hardware 102 of the physical computer 101 lacks a GPU. The guest application 124 may run and perform GPU computations using the computation module 126 as if the application 124 were running on a host platform with a dedicated GPU. As such, exemplary aspects of the present disclosure may be used without needing changes be made to the application 124 to adapt the application 124 for executing in a VM on a host platform without a discrete GPU.

From the perspective of the guest application, the guest application 124 uses the computation module 126 to perform a computation using resources of a GPU of the VM 120, which is represented by a virtual GPU 136 depicted in dashed outline in FIG. 1. Although the present disclosure may prefer to the virtual GPU 136, it is understood that the GPU 136 represents GPU resources seen from the point of view of the guest application, rather than an actual virtualized component managed by the VMM 110 like the virtual CPU 131 or guest physical memory 132.

According to one exemplary aspect, the guest application 124 executing in the VM 120 is configured to use the computation module 126 to perform one or more GPU computations. Example pseudo-code for a guest application 124 is provided in Table 1 below.

TABLE 1

Pseudocode for Guest Application

```
1   _GPUComputationCode_
2   void saxpy(n, a, x, y) {
3       i = getBlockIdx().x * getBlockDim( ).x + getThreadIdx( ).x;
4       if (i < n) y[i] = a * x[i] + y[i];
5   }
6
7   int main(void) {
8       var x, y; // host copies of x, y
9       var g_x, g_y; // GPU copies of x, y
10
11      if (CM_GetDeviceCount( ) < 1) {
12          exit
13      } else {
14          properties = CM_GetDeviceProperty(deviceNum);
15      }
16
17      // Allocate space for GPU copies of x, y
18      CM_Malloc(&g_x, size);
19      CM_Malloc(&g_y, size);
20
21      // setup input values of x, y
22      for i in range(0,N) {
23          x[i] = 1.0f;
24          y[i] = 2.0f;
25      }
26
27      // Copy inputs to GPU
28      CM_Memcpy(g_x, &y, size, CM_MemcpyHostToDevice);
29      CM_Memcpy(g_y, &y, size, CM_MemcpyHostToDevice);
30
31      // Start execution of saxpy( ) computation code on GPU
32      saxpy<<< gridSize, blockSize >>>(N, 2.0f, g_x, g_y);
33
34      // Copy result back to host
35      CM_Memcpy(y, g_y, size, CM_MemcpyDeviceToHost);
36  }
```

In some exemplary aspects, the guest application 124 may use the computation module 126 to query its host environment (e.g., VM 120) for any devices that support GPU computations. In the example shown in Table 1, the guest application 124 may invoke CM_GetDeviceCount( ) and CM_GetDeviceProperty( ) API methods of the computation module 126 to query the environment for suitable GPUs (see lines 11-15 in Table 1). Even though the physical computer 101 lacks a discrete physical GPU, the computation module 126 is configured to report back to the guest application 124 that one or more GPUs 136 are available to. In some exemplary aspects, the computation module 126 may also return device information for the virtual GPUs 136 which in fact correspond to information about physical GPUs 156 available to the remote node 160, including such device information as the clock rate of the dedicated memory of the GPU, the width of the GPU memory bus, amounts of global memory, shared memory, constant memory, number of block registers, the warp size, etc.

In some exemplary aspects, the program code for the guest application 124 includes a portion of program code that is to be executed by a GPU. This portion, sometimes referred to as GPU computation code, device code, kernel, or a kernel function, can be compiled by a computation-related compiler into code from a GPU-executable instruction set. In some exemplary aspects, the GPU computation code may be stored as a string literal or imported as a string value from a file path within the program code for the application 124. In other exemplary aspects, the GPU computation code may be source code identified by a compiler by a qualifier "_GPUComputationCode_". In the exemplary aspect shown in Table 1, program code in lines 1-5 provide an example function comprised of a Single-Precision A•X Plus Y ("SAXPY") computation that includes scalar multiplication and vector addition.

As will be described in greater detail below, the guest application 124 may be further configured to, via the computation module 126, declare and allocate memory resources of the guest system and the GPU 136, initialize the input data set, transfer the data from the guest system to the GPU 136, and transfer results from the GPU 136 to the guest system (e.g., vCPU 131). The computation module 126 is configured to intercept these requests from the guest application 124 and coordinate with the remote node 160 to perform the GPU computations remotely from the physical computer 101. For example, the computation module 126 may be configured to intercept commands for GPU computational grids configurations, start and finish of GPU code execution, and data transferring to and from the GPU.

The computation module 126 provides a parallel computing API that gives software, such as guest applications 124, direct access to a GPU's instruction set and parallel computation elements for the execution of general purpose processing (i.e., GPGPU). The computation module 126 may be configured to intercept one or more requests to the parallel computing API invoked by the guest application 124 and relay a corresponding request to the remote node 160. Examples of parallel computing APIs include CUDA, made available by NVidia Corporation, or Open Computing Language (OpenCL). In some exemplary aspects, the computation module 126 may be configured to provide a heterogeneous parallel computing API that enables a GPU and a variety of other types of co-processors to work in tandem with a CPU. In other exemplary aspects, the computation module 126 may be configured to provide a homogenous parallel computing API that uses only GPUs.

Exemplary aspects of the present disclosure may be implemented as a software library that exposes a similar API as existing libraries that support a parallel computing API, such as CUDA or OpenCL, and is registered with a same globally unique identifier (GUID) if exposed as a software object (e.g., Component Object Model, or COM) as the existing libraries. In another exemplary aspect, the described techniques may be implemented by patching existing software libraries installed on the computer 101 or COM objects by injecting traps directly into memory, or through code patches.

In one exemplary aspect, the system 100 includes one or more other physical computers 150 executing a remote node 160 that is communicatively connected to the first physical computer 101. The second physical computer 150 includes system hardware 152 that may be similar to the system hardware 102 of the first physical computer 101, for example, having at least a CPU 154, memory 155, storage, and other hardware components not shown. The remote node 160 executing on the physical computer 150 is configured to communicate with the computation module 126 to perform one or more GPU computations using the system hardware 152 of the physical computer 150.

In one exemplary aspect, the system hardware 152 of the second physical computer 150 includes a GPU 156. The GPU 156 is a special-purpose processor chip configured to rapidly manipulate and alter memory to accelerate the creation of images in a frame buffer intended for output to a display device. The GPU 156 may include a plurality of computing cores, also referred to as processing elements or scalar cores, configured for processing large blocks of data in parallel. The GPU 156 may further include its own dedicated memory, which is separate from the conventional RAM 155 of the system hardware 152, and which may be specially selected for handling the serial workloads of the GPU 156 (e.g., GDDR SDRAM).

In some exemplary aspects, the remote node 160 executing on the physical computer 150 may be a part of computing resources deployed from a cloud service or infrastructure-as-a-service (IaaS), such as Amazon Web Services™ (AWS). In this case, the remote node 160 may be dynamically allocated computation nodes communicatively connected to the physical computer 101 by a network, such as the Internet. In other exemplary aspects, the physical computer 150 may be a dedicated server that has GPUs 156 and accelerators, is part of a data center on the same premise as the first physical computer 101 executing the VMs 120. The physical computer 150 may be communicatively connected to the first physical computer 101 by a local network, such as a Local Area Network (LAN).

In general, the term "module" as used herein can refer to a software service or application executed as part of the guest operating system 122 or the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 2:
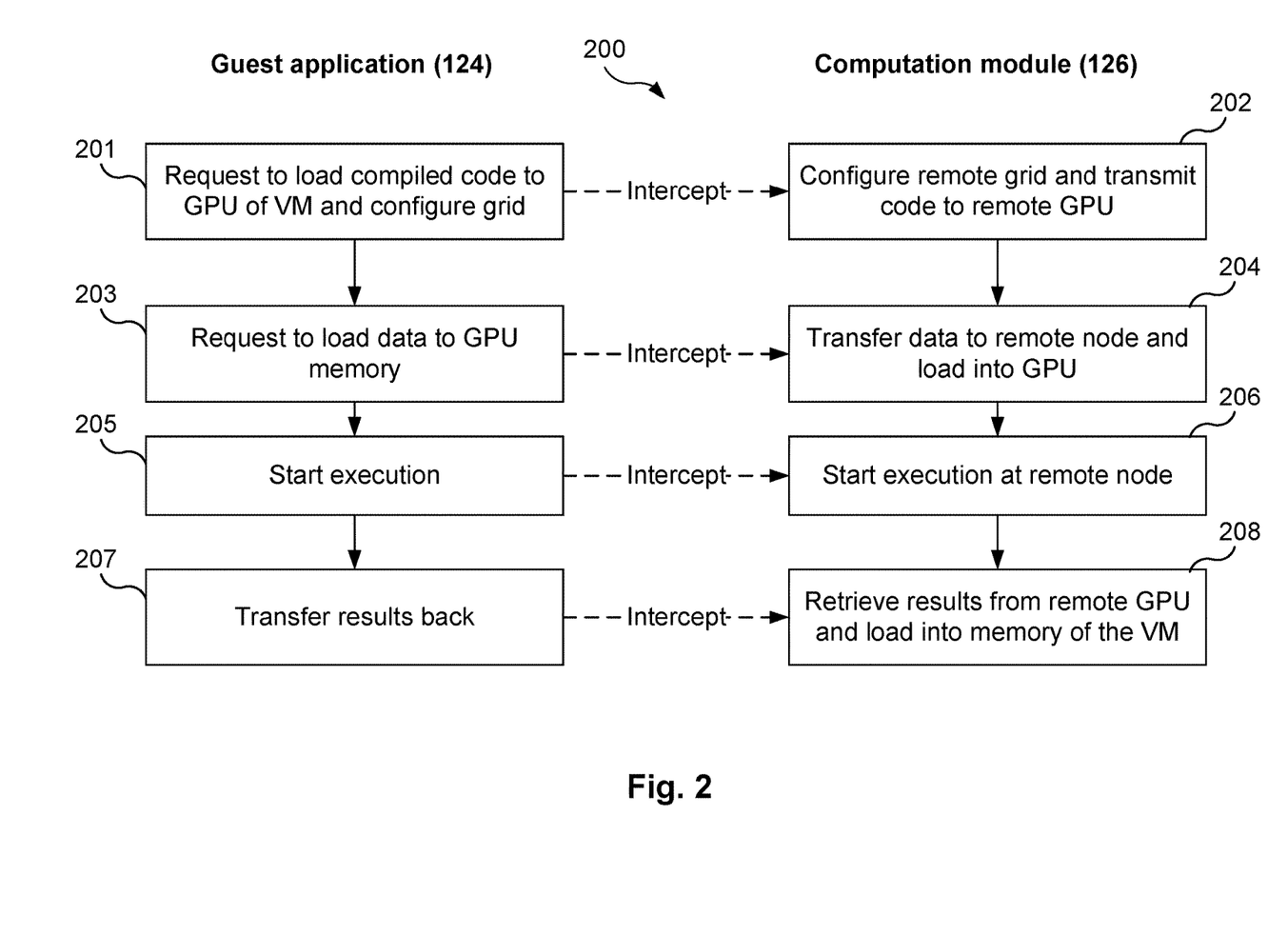
FIG. 2 illustrates a flowchart for a method for performing GPU computations on a virtual machine without a discrete graphics processing unit (GPU) according to an exemplary aspects.

FIG. 2 illustrates a flowchart of a method 200 for performing GPU computations on a virtual machine without a discrete graphics processing unit (GPU) according to an exemplary aspects. It is noted that the following description of the exemplary method makes reference to the system and components described above.

As shown, the method 200 begins at step 201, in which the guest application 124 sends a request to load compiled code of a GPU computation to the "GPU" of the virtual machine. The compiled code may be code in a GPU-executable format configured to perform non-display-related computations. In one example, the guest application 124 may invoke an API call of the computation module 126 to load a compute module, e.g., CM_ModuleLoad( ) from a file containing GPU computation compiled code and stored in the VM 120.

In some exemplary aspects, the guest application 124 may also send a request to configure a GPU grid. For example, the application 124 may request to allocate GPU resources for storing one or more temporary data structures used in the GPU computation, e.g., CM_Malloc( ) seen in lines 18-19 of Table 1. In another example, the application 124 may configure a grid size and a block size for the GPU computation.

In some exemplary aspects, a grid configuration is used to properly set up a number of running threads in parallel. The guest application may allocate a 1D, 2D, 3D grid with an appropriate x, y, and z dimensions to run the GPU computation in parallel. The guest application may query for available options for a GPU grid configuration by requesting information about the GPU (e.g., via methods such as GetDeviceCount( ) and GetDeviceProperty( ). For example, the computation module 125 may report back that the GPU has two computing units which have 256 threads each is available (i.e., an application could theoretically run 512 threads simultaneously). Then, the guest application may transmit a request to configure the GPU grid with x,y,z dimensions such that x,y,z<=512 threads to run the GPU computation in parallel. It is noted that the ability to query for available resources first enables the guest application to prevent situations in which the guest applications asks for more threads than is possible, which results in the threads waiting in queue at the GPU to be processed.

At step 202, the computation module 126 intercepts, from the user application, the request to load the non-display GPU computation in the virtual machine. Responsive to intercepting the load request, the computation module 126 may transmit the non-display GPU computation comprised of GPU instructions to the remote node 160 executing on another physical computer 150 that has a discrete physical GPU 156.

In some exemplary aspects, the computation module 126 may also intercept the request to configure a GPU grid, and in turn, transmit one or more requests for configuring resources of the physical GPU 156 of the second physical computer. In some exemplary aspects, the request to configure the GPU grid may be combined with other requests from the guest applications, such as the request to load the non-display GPU computation or the request to start execution of the non-display GPU computation (as in step 205 below).

In some exemplary aspects, the remote node 160 may send a response to the guest application 124 (e.g., via the computation module 126) that indicates an amount of available GPU resources. The remote node 160 may determine a count of threads which can be executed in parallel, which may depend upon how much a user account (e.g., a developer account associated with the guest application) has paid or a level of priority associated with the user account), and report the count back to the computation module 126.

At step 203, the user application 124 may send a request to load data into GPU memory of the virtual machine. In some exemplary aspects, the user application 124 invokes a memory copy API call of the computation module 126 designed to copy bytes of an input data set from the guest physical memory 132 of the VM 120 to the GPU 136. For example, in Table 1, the user application may invoke a CM_Memcpy( ) function that specifies a destination memory address in the GPU 136, a source memory address from the guest physical memory 132, the number of bytes to be transferred, and a type of transfer (e.g., from CPU to GPU, GPU to CPU, etc.). In another example, the user application may invoke a CM_moduleLoadData( ) function of the computation module 126 that loads a particular data set into a current context.

At step 204, the computation module 126 may intercept the request, and in turn, transfer the input data set for the non-display GPU computations to the remote node 160 for loading into a memory of the physical GPU 156. In some exemplary aspects, the functionality of the memory copy API call of the computation module 126 is to in fact transfer the input data set to the remote node 160 on the second physical computer 150. For example, the computation module 126 may transfer the contents of the data stored in the x and y arrays to the remote node 160. The remote node 160 may then load the input data into one or more memory resources of the GPU 156.

At step 205, the user application 124 may send a request to start execution of the non-display GPU computation by the "GPU" 136 of the virtual machine. For example, the application 124 may invoke a launchKernel( ) method of the computation module 126, or in the example pseudo-code of Table 1, use a triple caret notation to start execution of a GPU computation with one or more input variables.

At step 206, the computation module 126 intercepts the request to start execution, and in turn, transmits to the second physical computer 150 a request to execute the non-display GPU computation using the physical GPU 156 of the second physical computer. The computation module 126 may relay to the remote node 160 one or more input variables used for launching the GPU computation code. The GPU computation code may be launched as a grid of blocks of threads having a grid size and a block size specified by the input variables ("saxpy<<<gridSize, block-Size>>>"), sometimes also referred to as a grid of workgroups of work items. In some exemplary aspects, the request to start execution of the GPU computation may further include initial parameters for the GPU computation code (e.g., "(N, 2.0f, g_x, g_y)").

At step 207, at some subsequent time later, the user application may send a request to transfer results back from the GPU 136 of the virtual machine. For example, the user application 124 may invoke a memory copy request of the computation module 126 designed to perform a GPU-to-CPU type of transfer, i.e., CM_Memcpy(y, g_y, size, CM_MemcpyDeviceToHost). At step 208, the computation module 126 intercepts this request to transfer results of the non-display GPU computation, and in response, retrieves from the remote node 160 results from the physical GPU 156 of the second physical computer 150. The computation module 126 loads the retrieved results into a memory (e.g., RAM 132) of the virtual machine 120. As such, the results can be returned to the user application 124 from the memory 132 of the virtual machine.

Figure 3A:
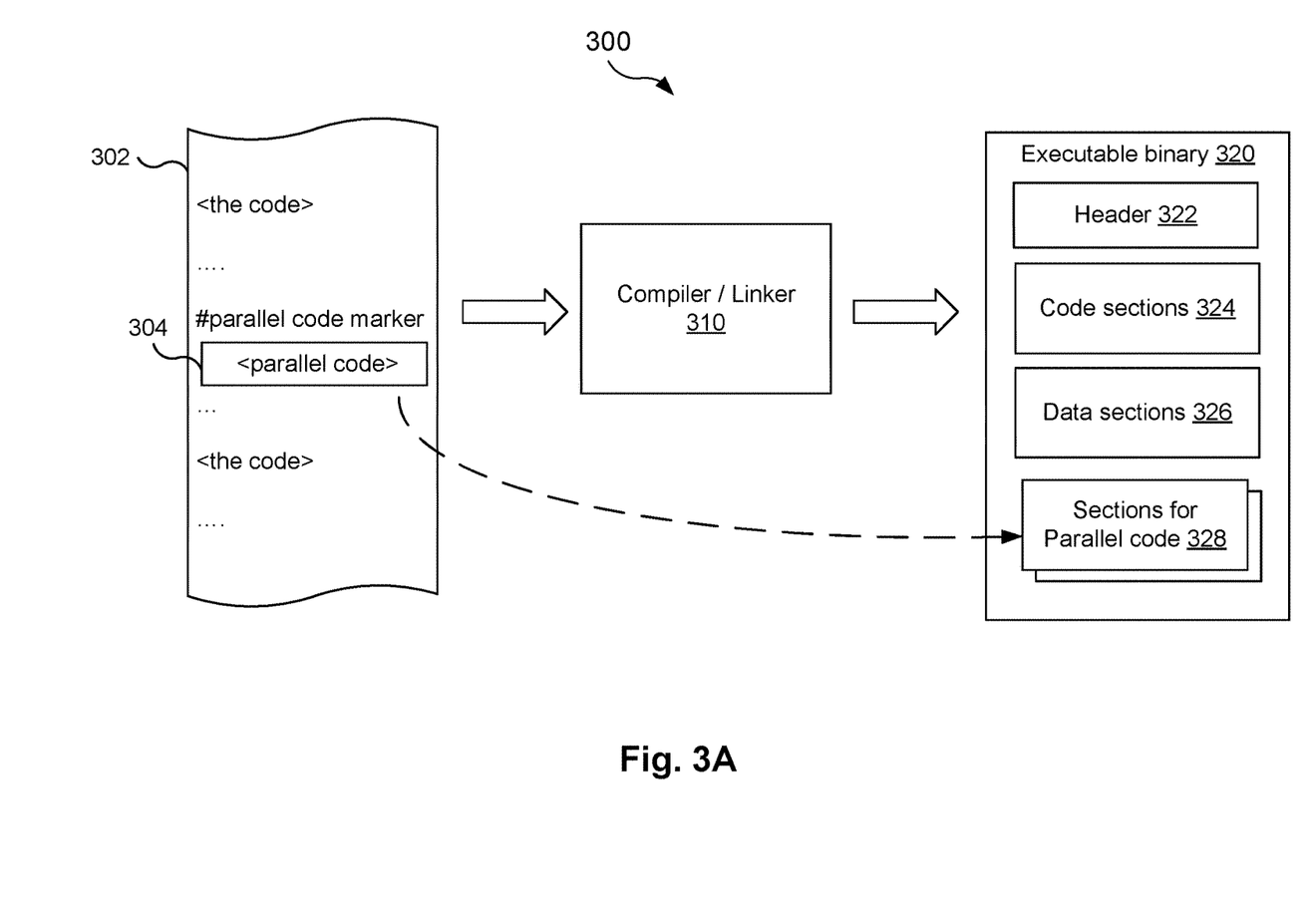
FIGS. 3A and 3B illustrate block diagrams of a system for executing computation code in a hardware accelerator.
Figure 3B:
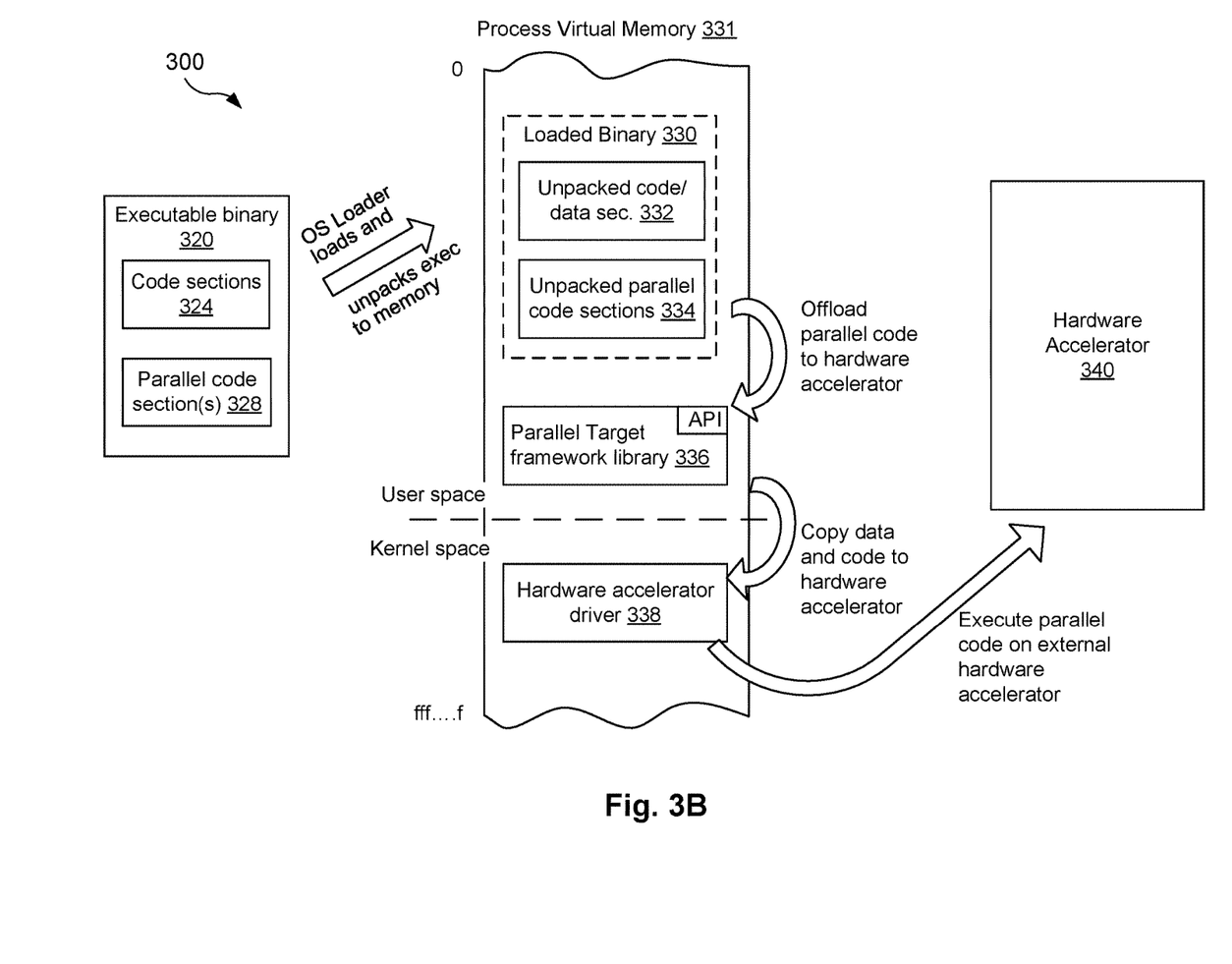

FIGS. 3A and 3B illustrate block diagrams of a system 300 for executing computation code in a hardware accelerator. The system 300 includes one or more hardware accelerators 340 configured to support execution of computation code on externals boards (plugged to a physical computer, e.g., through a PCI interface), instead of running the code on the main processor (e.g., CPU 104). Examples of hardware accelerators include Intel-MIC architecture based Xeon Phi™ processors (e.g., "Knights Ferry" boards), NVidia Tesla® GPU, and others. Such hardware accelerators 340 typically have proprietary interfaces. To support parallel code, hardware accelerator drivers 338 provide a proprietary interface to libraries running in user space (e.g., parallel target framework library 336). Both kernel space drivers 338 and user space libraries 336 are often implemented as hardware-accelerator-vendor-specific. These libraries 336 provide an API for user space applications to access hardware code-offloading capabilities of hardware accelerators 340. There are some standard framework libraries providing standardized APIs for third-party software and are recognized by modern compilers, such as Intel® C/C++/Fortran compiler, LLVM-clang, GCC, etc.

As shown in FIG. 3A, a software developer may mark portions 304 in source code 302 in a special way to indicate to a compiler 310, which is configured to support parallel programming, that these code portions can be offloaded to selective targets. For example, the source code 302 may include one or more code markers (e.g., "#parallel code marker") or directive pragma that specify how the compiler 310 (or linker) should process the portions 304 of the source code 302. Other suitable techniques for hinting or signaling to compilers may be used, such as found in the OpenMP API (Open Multi-Processing), OpenCL, and CUDA.

During compilation, the compiler 310 compiles the source code 302 into an executable binary 320 having a header portion 322, code sections 324, and data sections 326. The compiler 310 sees particular pragmas and tags in the source code 304 and compiles the marked code for several target simultaneously putting the target code into separate sections 328 of the executable binary 320. Additionally, the compiler 310 adds particular framework library function calls to the executable binary 320. These library calls can diagnose the presence of the hardware accelerator 340 during the executable's run, copy shared data or buffers to and from the hardware accelerator 340, and initiate parallel code (marked in the way described earlier) execution on the hardware accelerator 340.

As shown in FIG. 3B, during execution of the executable binary 320, an OS loader loads and unpacks the executable binary 320 into the process's virtual memory 331 (e.g., host virtual memory), having a virtual address range from 0 to fff . . . f. The loaded binary 330 includes unpacked code and data sections 332 and unpacked parallel code sections 334. The loaded binary 330 uses the parallel target framework library 336 to offload the parallel code sections 334 to the hardware accelerator. For example, calls in the loaded binary to the library 336 may cause the hardware accelerator driver 338 (e.g., executing in kernel space) to copying the data and code to the hardware accelerator 340, initiate a "remote" execution, and execute the parallel code in the hardware accelerator 340.

Figure 4:
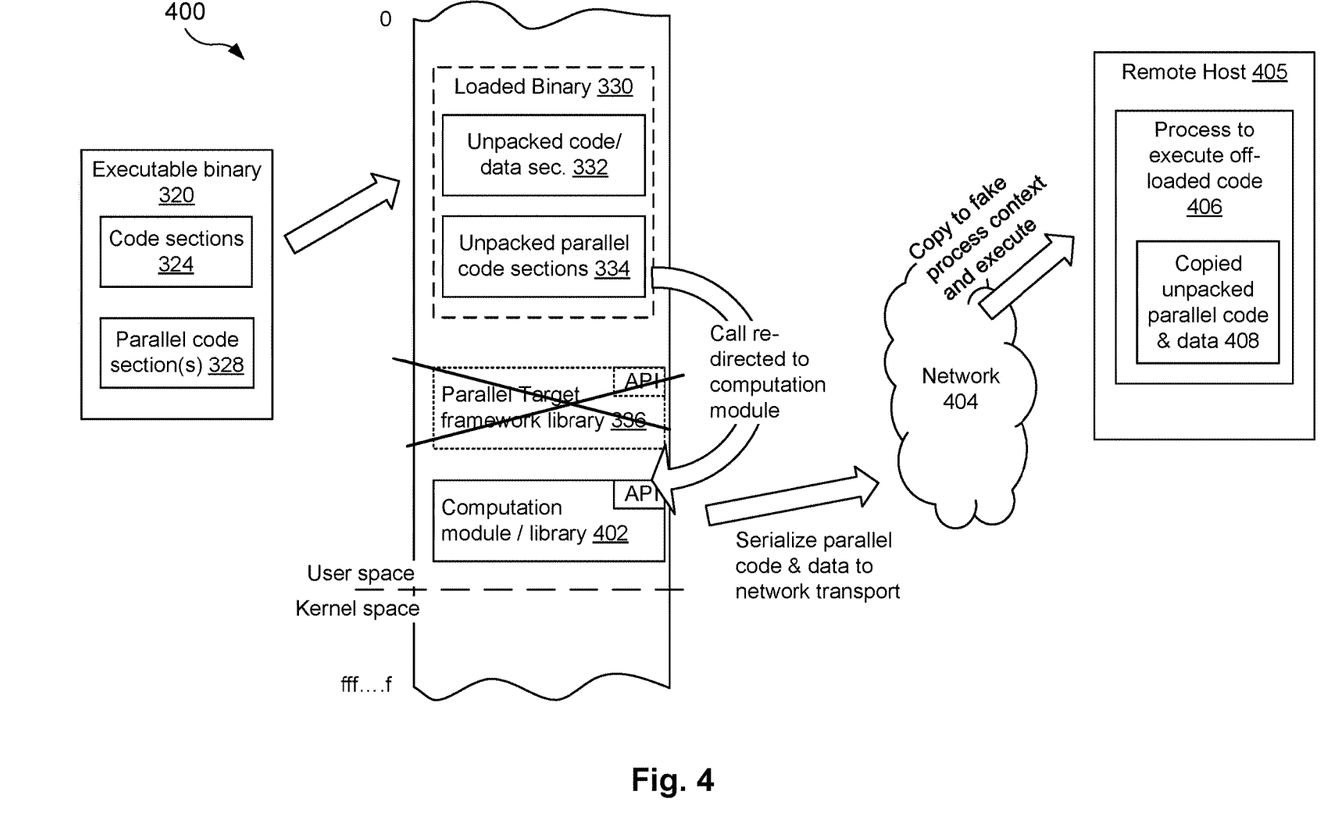
FIG. 4 illustrates a block diagram of a system for offloading computation code executing in parallel with main code according to an example aspect.

FIG. 4 illustrates a block diagram of a system 400 for offloading computation code executing in parallel with main code according to an example aspect. Similar to the example system 300, a compiler may build an executable binary 320 having particular parallel code 328 inline. The executable binary 320 may call framework API functions that sends data and parallel code to a hardware accelerator.

During execution of the executable binary 320 on a source host, the OS loader loads and unpacks the executable binary 320 into the process's virtual memory 331. Unique to system 400, the framework library 336 has been replaced with a computation library or module 402 configured to accept the offloading library calls from the executable binary 320. In some aspects, the computation library 402 acts as a substitute parallel library having the same or substantially similar API (of parallel target framework library 336), with which the executable binary 320 has been built. Library API calls (originally intended for the library 336) are instead re-directed to the computation library 402. In one aspect, the computation library 402 may be executing in user space.

As shown in FIG. 4, instead of sending data and code to a hardware accelerator 340, the computation module 402 may be configured to transmit data to a remote host 405. The remote host 405 may be compatible with one of the parallel code targets, but need not have a dedicated hardware accelerator 340. For example, the parallel code having x86 code built for Xeon Phi systems may be offloaded to a remote x86 host personal computer or mobile device. The computation library 402 may serialize the parallel code and data to a network transport (e.g., network 404). The remote host 405 may include a "fake" process 406 executing the offloaded code, which includes copied, unpacked parallel code and data 408. The computation library 402 may copy the parallel code and data to the fake process' context and execute. In some aspects, when the source executable 330 informs the substituted library 402 about execution of parallel code on a hardware accelerator, the computation module 402 notifies the remote host 405 to execute the particular code remotely. In some aspects, offloaded code can be executed on the source host as well (i.e., without sending it to the remote host). In such cases, the computation library 402 makes a determination of whether it is necessary to offload the parallel code to the remote host 405 or not, in accordance with the status of the source host (e.g., based on the source host CPU load).

In some aspects, the computation module 402 may be configured similar to the computation module 126 described in conjunction with FIG. 1, except that computation module 402 may run on a host operating system (as opposed to a guest operating system.) The computation module 402 may be configured to intercept, from a executable binary executing in a source host, a request to load a parallel code computation in a hardware accelerator of the source host. The parallel code computation may be comprised of binary code built from source code having code markers that represented a section of code (e.g., to the compiler) for parallel execution. The computation module 402 may be configured to transmit the parallel code computation to a remote host for copying into to a context of a remote process. The computation module 402 may be configured to, responsive to intercepting from the loaded binary a request to start execution of the parallel computation by the hardware accelerator, transmitting to the remote host a request to execute the parallel computation using the physical resources of the remote host. The computation module 402 may be configured to, responsive to intercepting from the executed binary, a request to transfer results of the parallel computation, retrieve results from the remote host, and loading the retrieved results into a virtual memory space of the executable binary on the source host.

Figure 5:
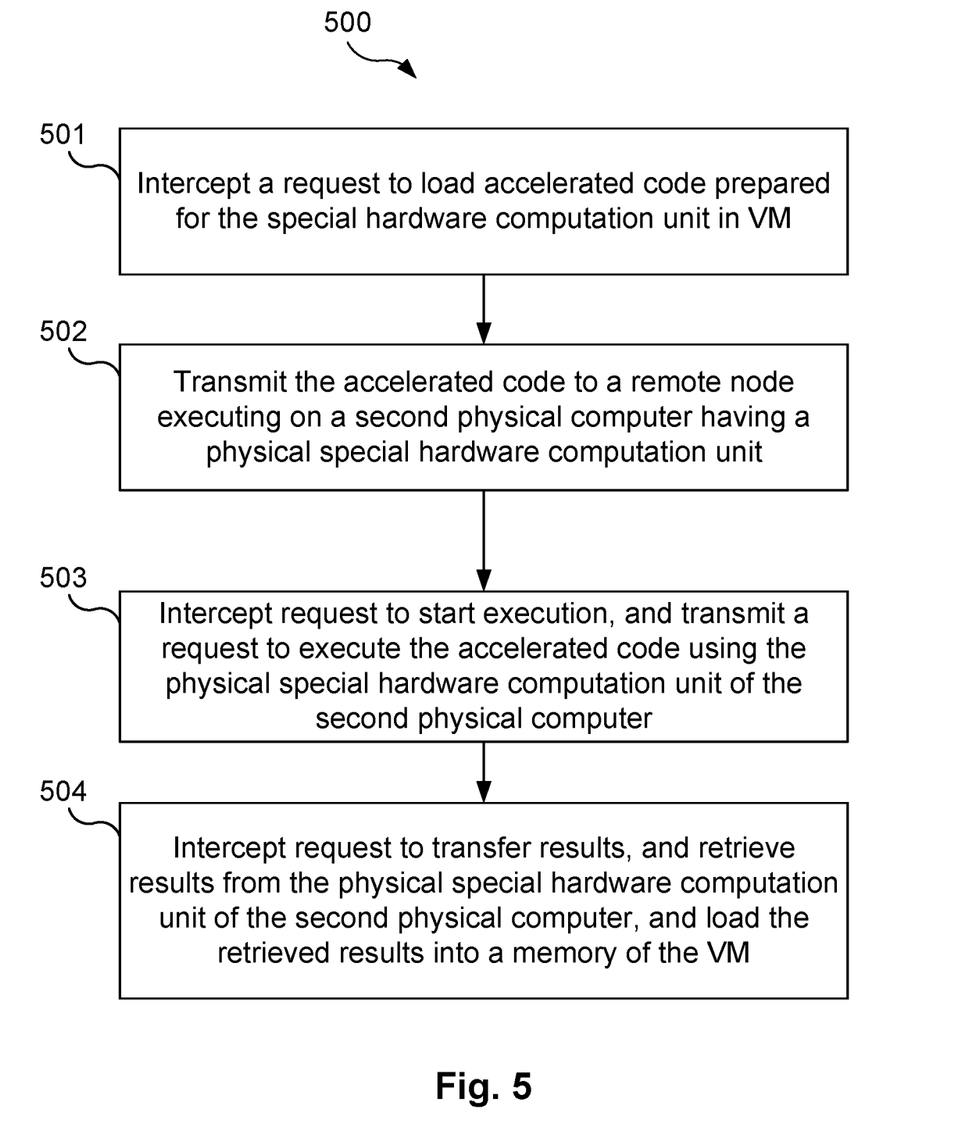
FIG. 5 illustrates a flowchart of a method for performing computations on a virtual machine without a special hardware computation unit, according to an exemplary aspects.

FIG. 5 illustrates a flowchart of a method 500 for performing computations on a virtual machine without a special hardware computation unit, according to an exemplary aspects. It is noted that the following description of the exemplary method makes reference to the system and components described above.

The method 500 begins at step 501, in which the computation module 126 intercepts, from a user application executing in the virtual machine, a request to load accelerated code prepared for the special hardware computation unit in the virtual machine. The virtual machine is executing in a first physical computer. In some aspects, the special hardware computation unit may be a discrete graphics processing unit (GPU), and the accelerated code is a non-display GPU computation. That is, the first physical computer may lack a discrete physical graphics processing unit (GPU). In other aspects, the special hardware computation unit may be another type of specialized hardware accelerator configured to perform some functionality more efficiently than is possible in execution on a general-purpose central processor unit (CPU). In some aspects, the computation module 126 may provide to the user application a parallel computing application programming interface (API) configured to off-load the accelerated code to the second physical computer.

In some aspects, the computation module 126 may, responsive to intercepting from the user application a request to allocate special hardware computation unit resources of the virtual machines, configure resources of the physical special hardware computation unit of the second physical computer.

At step 502, the computation module 126 transmits the accelerated code comprised of special hardware computation unit instructions to a remote node executing on a second physical computer having a physical special hardware computation unit. In some aspects, the computation module 126 may transfer an input data set for the accelerated code to a memory of the physical special hardware computation unit of the second physical computer.

At step 503, responsive to intercepting from the user application a request to start execution of the accelerated code by the special hardware computation unit of the virtual machine, the computation module 126 transmits to the second physical computer a request to execute the accelerated code using the physical special hardware computation unit of the second physical computer.

At step 504, responsive to intercepting from the user application a request to transfer results of the accelerated code execution, the computation module 126 retrieves results from the physical special hardware computation unit of the second physical computer, and loads the retrieved results into a memory of the virtual machine.

Figure 6:
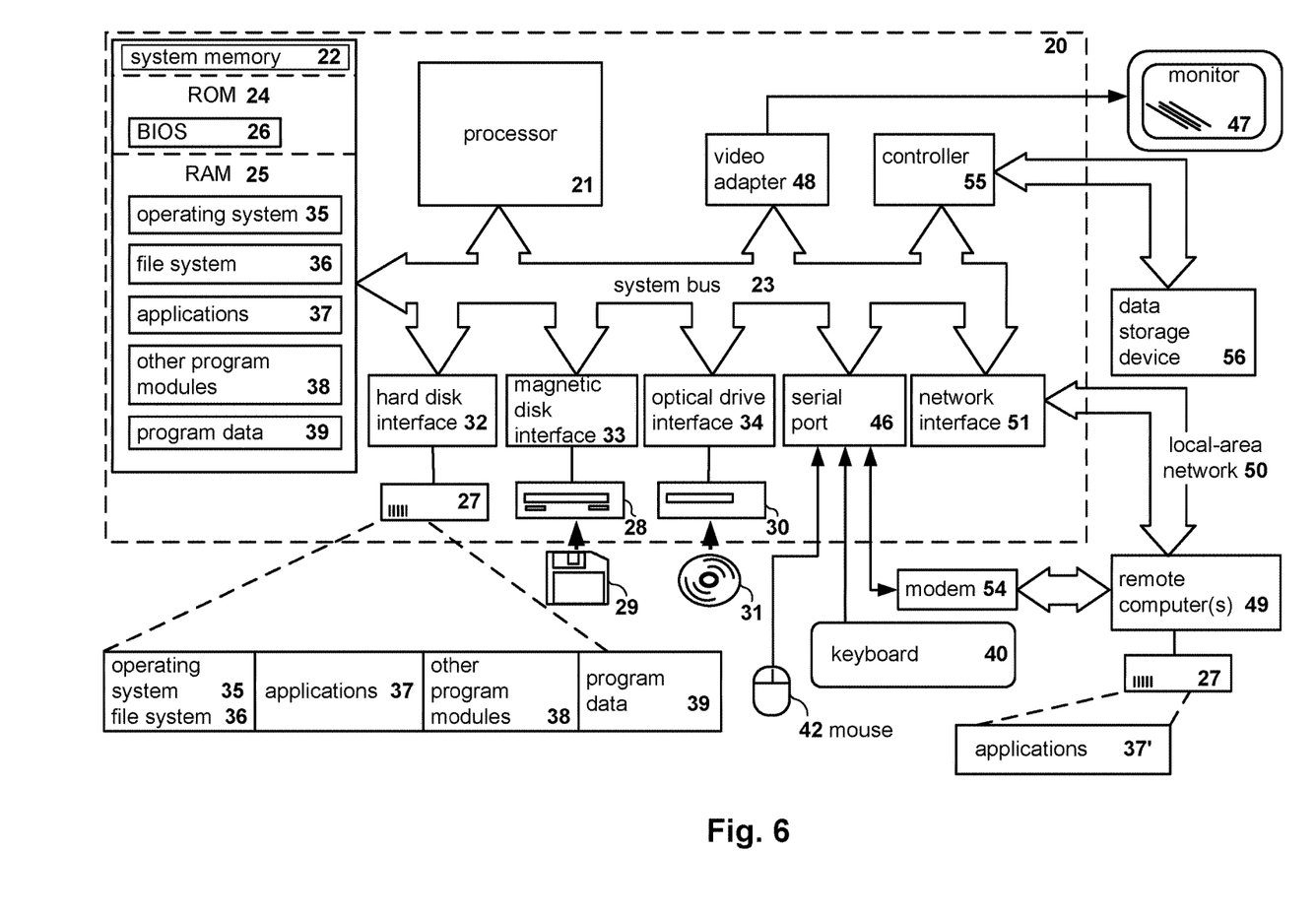
FIG. 6 illustrates a block diagram of an example of a general-purpose computer system on which the disclosed system and method can be implemented according to an exemplary aspect.

FIG. 6 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the physical computers 101, 150, or systems 300, 400 described above, for example.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for performing computations on a virtual machine without a special hardware computation unit, the method comprising:

intercepting, from a user application executing in the virtual machine, a request to load accelerated code prepared for the special hardware computation unit in the virtual machine, wherein the virtual machine is executing in a first physical computer;

transmitting the accelerated code comprised of special hardware computation unit instructions to a remote node executing on a second physical computer having a physical special hardware computation unit;

responsive to intercepting from the user application a request to start execution of the accelerated code by the special hardware computation unit of the virtual machine, transmitting to the second physical computer a request to execute the accelerated code using the physical special hardware computation unit of the second physical computer; and responsive to intercepting from the user application a request to transfer results of the accelerated code execution, retrieving, by the virtual machine, results from the physical special hardware computation unit of the second physical computer, and loading the retrieved results into a memory of the virtual machine.

2. The method of claim 1, wherein the special hardware computation unit is a discrete graphics processing unit (GPU), and wherein the accelerated code is a non-display GPU computation.

3. The method of claim 1, further comprising:
responsive to intercepting from the user application a request to allocate special hardware computation unit resources of the virtual machines, configuring resources of the physical special hardware computation unit of the second physical computer.

4. The method of claim 1, further comprising:
transferring an input data set for the accelerated code to a memory of the physical special hardware computation unit of the second physical computer.

5. The method of claim 1, wherein the first physical computer lacks a discrete physical graphics processing unit (GPU).

6. The method of claim 1, further comprising:
providing to the user application a parallel computing application programming interface (API) configured to off-load the accelerated code to the second physical computer.

7. A system for performing computations on a virtual machine without a special hardware computation unit, the system comprising:
a first physical computer having a CPU and a memory coupled to the CPU;
at least one virtual machine executing on the first physical computer;
a user application and a computation module executing in the virtual machine;
a second physical computer having a physical special hardware computation unit and a remote node;
wherein the computation module is configured to:
intercept, from the user application executing in the virtual machine, a request to load accelerated code in the virtual machine;
transmit the accelerated code comprised of special computation unit instructions to the remote node executing on the second physical computer;
responsive to intercepting from the user application a request to start execution of the accelerated code by the special hardware computation unit of the virtual machine, transmit to the second physical computer a request to execute the accelerated code using the physical special hardware computation unit of the second physical computer; and
responsive to intercepting from the user application a request to transfer results of the accelerated code execution, retrieve, by the virtual machine, results from the physical special hardware computation unit of the second physical computer, and load the retrieved results into a memory of the virtual machine.

8. The system of claim 7, wherein the special hardware computation unit is a discrete graphics processing unit (GPU), and wherein the accelerated code is a non-display GPU computation.

9. The system of claim 7, wherein the computation module is further configured to:
responsive to intercepting from the user application a request to allocate special hardware computation unit of the virtual machines, configure resources of the physical special hardware computation unit of the second physical computer.

10. The system of claim 7, wherein the computation module is further configured to:
transfer an input data set for the accelerated code to a memory of the physical special hardware computation unit of the second physical computer.

11. The system of claim 7, wherein the first physical computer lacks a discrete physical graphics processing unit (GPU).

12. The system of claim 7, wherein the computation module is further configured to:
provide to the user application a parallel computing application programming interface (API) configured to off-load the accelerated code to the second physical computer.

13. A non-transitory computer readable medium comprising computer executable instructions for performing computations on a virtual machine without a special hardware computation unit, including instructions for:
intercepting, from a user application executing in the virtual machine, a request to load accelerated code in the virtual machine, wherein the virtual machine is executing in a first physical computer;
transmitting the accelerated code comprised of special computation unit instructions to a remote node executing on a second physical computer having a physical special hardware computation unit;
responsive to intercepting from the user application a request to start execution of the accelerated code by the special hardware computation unit of the virtual machine, transmitting to the second physical computer a request to execute the accelerated code using the physical special hardware computation unit of the second physical computer; and
responsive to intercepting from the user application a request to transfer results of the accelerated code execution, retrieving, by the virtual machine, results from the physical special hardware computation unit of the second physical computer, and loading the retrieved results into a memory of the virtual machine.

14. The non-transitory computer readable medium of claim 13, wherein the special hardware computation unit is a discrete graphics processing unit (GPU), and wherein the accelerated code is a non-display GPU computation.

15. The non-transitory computer readable medium of claim 13, wherein the instructions further comprise instructions for:
responsive to intercepting from the user application a request to allocate special hardware computation unit resources of the virtual machines, configuring resources of the physical special hardware computation unit of the second physical computer.

16. The non-transitory computer readable medium of claim 13, wherein the instructions further comprise instructions for:
transferring an input data set for the accelerated code to a memory of the physical special hardware computation unit of the second physical computer.

17. The non-transitory computer readable medium of claim 13, wherein the first physical computer lacks a discrete physical graphics processing unit (GPU).

18. The non-transitory computer readable medium of claim 13, wherein the instructions further comprise instructions for:
providing to the user application a parallel computing application programming interface (API) configured to off-load accelerated code to the second physical computer.

* * * * *